United States Patent [19]

Lindee et al.

[11] Patent Number: 4,768,325
[45] Date of Patent: Sep. 6, 1988

[54] PAPER INTERLEAVER FOR FOOD PATTY MOLDING MACHINE

[75] Inventors: Scott A. Lindee; Wilbur A. Janssen, both of New Lenox, Ill.

[73] Assignee: Alfa-Laval AB, Stockholm, Sweden

[21] Appl. No.: 106,128

[22] Filed: Oct. 7, 1987

[51] Int. Cl.⁴ .................. B65B 35/54; B65B 63/02
[52] U.S. Cl. ............................. 53/122; 53/157; 271/98; 271/107
[58] Field of Search ............... 53/122, 157, 389; 271/14, 97, 98, 99, 107, 267

[56] References Cited

U.S. PATENT DOCUMENTS

| | | |
|---|---|---|
| Re. 30,096 | 9/1979 | Richards et al. . |
| 3,126,683 | 3/1964 | Richards et al. . |
| 3,338,529 | 6/1968 | Holly . |
| 3,461,483 | 8/1969 | Felstehausen ............. 53/157 X |
| 3,488,918 | 1/1970 | Felstehausen ............. 53/122 X |
| 3,589,711 | 6/1971 | Holly . |
| 3,604,184 | 9/1971 | Shuttleworth . |
| 3,675,387 | 7/1972 | Lekan ....................... 53/157 |
| 3,710,533 | 1/1973 | Burns ....................... 53/157 |
| 3,851,442 | 12/1974 | Miles ....................... 53/122 |
| 3,952,478 | 4/1976 | Richards et al. ............ 53/122 |
| 3,991,168 | 11/1976 | Richards et al. ........... 53/157 X |
| 4,054,967 | 10/1977 | Sandberg et al. . |
| 4,074,509 | 2/1978 | Miles ....................... 53/157 X |
| 4,137,604 | 2/1979 | Sandberg et al. .......... 53/157 X |
| 4,182,003 | 1/1980 | Lamartino et al. . |
| 4,302,868 | 12/1981 | Wagner . |
| 4,329,828 | 5/1982 | Wagner ..................... 53/122 |
| 4,524,558 | 6/1985 | Miles ....................... 53/157 |

FOREIGN PATENT DOCUMENTS 1156111  6/1969  United Kingdom .

Primary Examiner—Horace M. Culver
Attorney, Agent, or Firm—Kinzer, Plyer, Dorn, McEachran & Jambor

[57] ABSTRACT

A paper interleaver for a food patty molding machine of the kind using a mold plate cyclically reciprocating along a linear path between a fill position and a knock-out position comprises a shuttle connected to the mold plate for synchronous movement along a linear path between a transfer position and a pickup position. When the mold plate is at its knock-out position and the shuttle at its pickup position, the shuttle pulls a single paper sheet from the bottom of a storage stack by vacuum; when the mold plate and shuttle are at their respective fill and transfer positions, the shuttle "puffs" the paper sheet up a very short distance to be held by downwardly facing vacuum ports of a fixed paper holder frame, essentially immune to clogging from the food product particles and juices present at the knock-out position. A molded patty subsequently moves down through the frame to pick up the paper sheet when the mold plate returns to the knock-out position. A grooved spindle at the paper storage stack cooperates with a shallow tapered groove in the stack support surface to assure a flat configuration for the paper sheets and elimination of paper particles.

24 Claims, 5 Drawing Sheets

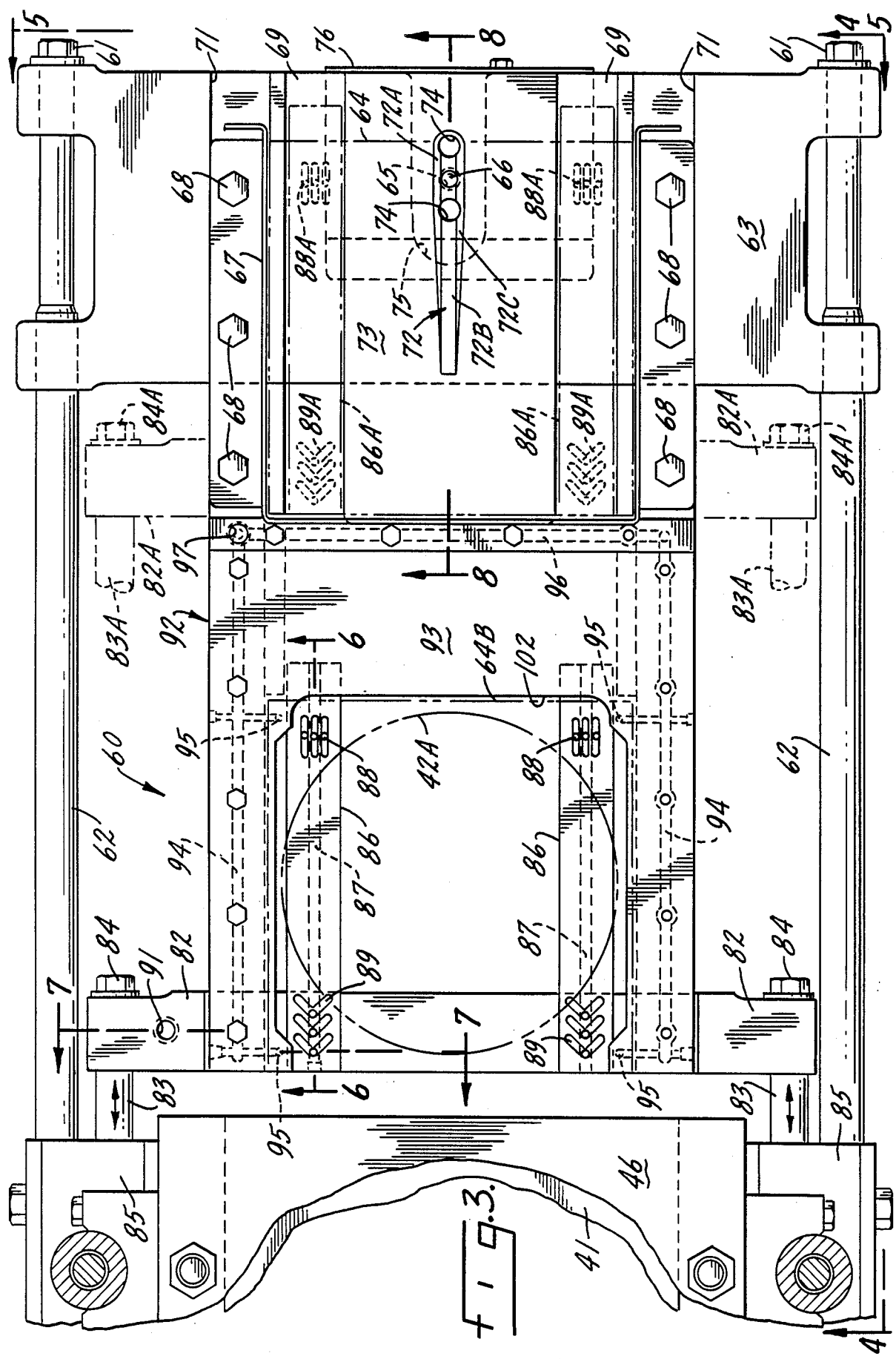

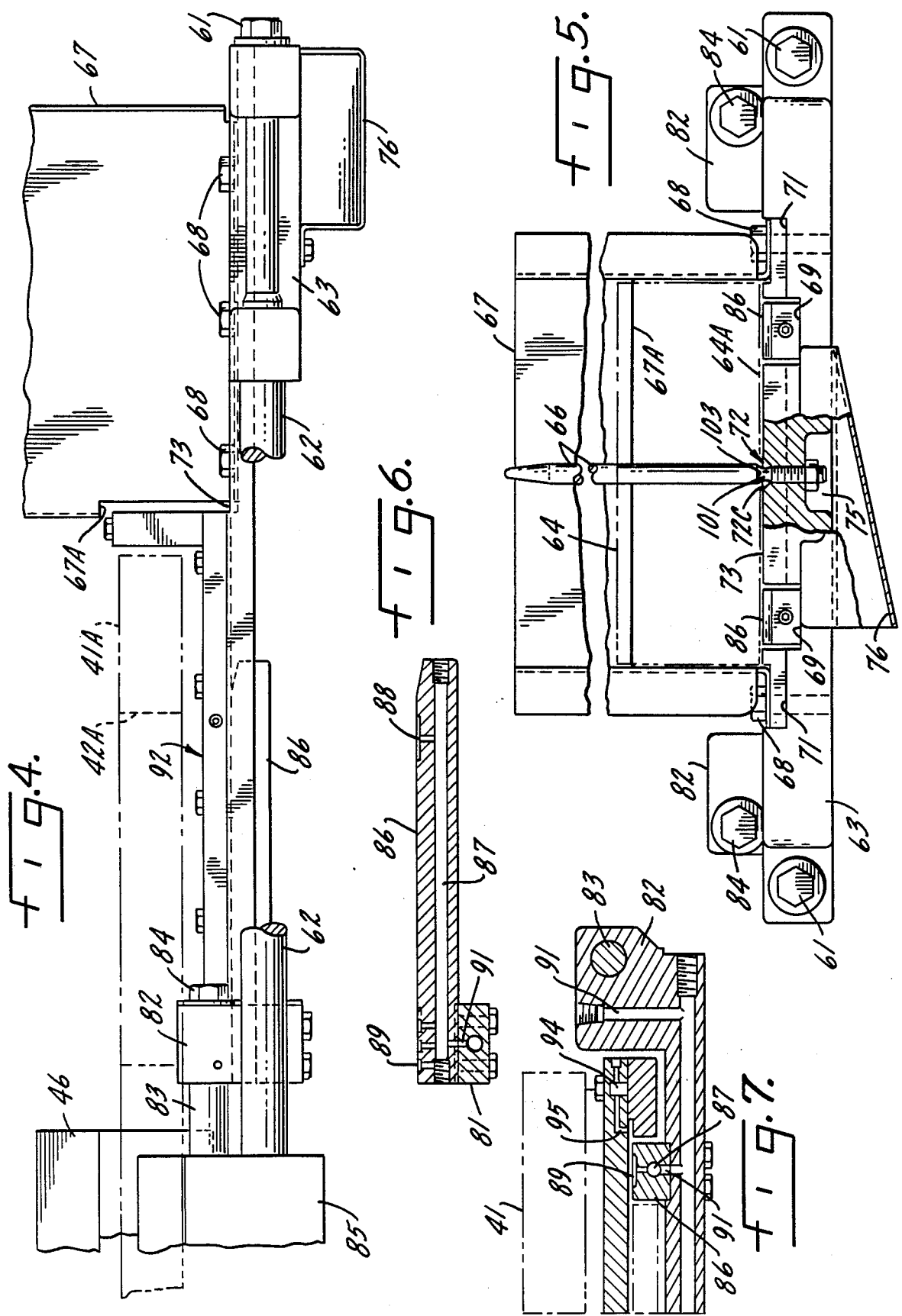

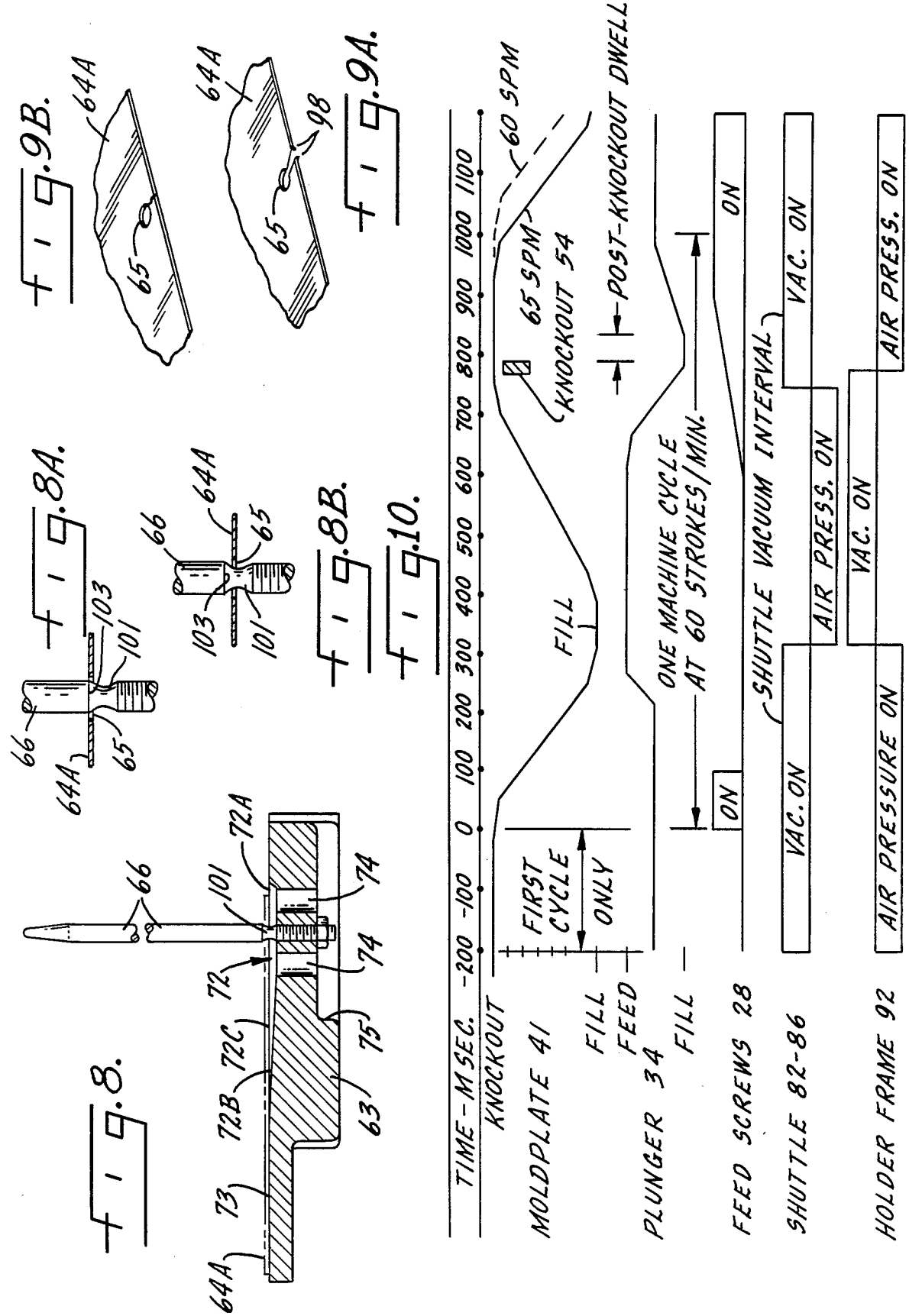

PAPER INTERLEAVER FOR FOOD PATTY MOLDING MACHINE

BACKGROUND OF THE INVENTION

Food patty molding machines are commonly employed for centralized manufacture of hamburger patties, chicken patties, fish patties, imitation steaks, and a variety of other molded patties of different food products. Three practical and efficient food patty molding machines that have enjoyed substantial commercial success are those described in U.S. Pat. Nos. Re. 30,096, to Richards et al, 4,054,967 to Sandberg et al and 4,182,003, to Lamartino et al, which are available as the F-26, F-19, and F-12 food patty molding machines, respectively, made and sold by Formax, Inc. of Mokena, Ill. The smallest of these machines, the Formax F-12 machine, is rather large for use by an individual restaurant or other establishment selling molded food patties directly to the consumer. On the other hand, other manufacturers have regularly produced food patty molding machines that are small enough to be effectively used in an individual restaurant or other food retail establishment.

It may be necessary or desirable to interleave individual paper sheets with the food patties produced by any food patty molding machine, whether large or small. A variety of different mechanisms for interleaving paper sheets with molded food patties, directly at the output of a food patty molding machine have been proposed. With respect to the Formax machines identified above, the most successful paper interleaver mechanism has been that described in Richards et al U.S. Pat. No. 3,952,478.

There are certain basic, recurring problems that appear in connection with most paper interleavers as applied to food patty molding machines. To begin with, the paper interleavers almost invariably function at the knock-out station of the patty molding machine, where the food patties are displaced from a cyclically operating mold plate with each patty engaging its paper sheet as it falls from the mold plate onto a takeaway conveyor. The knock-out station of the food patty molding machine is not a clean, pristine environment. Individual food product particles are frequently dislodged from patties during the knock-out operation. Juices produced by the molded food patties are almost inevitably present. As a consequence, those paper interleavers that employ vacuum positioning devices to hold the paper sheets in place for contact by the falling food patties are subject to clogging and blockage from the food particles and juices originating from the patties themselves. This presents a substantial and continuing problem and makes it quite difficult to maintain the paper interleavers in continuous operation.

Another common problem that occurs in the paper interleavers used with food patty molding machines is double-sheeting. If the paper supply for the interleaver is in an unrestrained stack, most conventional pickup mechanisms will occasionally pick up two or even more sheets. Double-sheeting may be less common where the paper supply is a restrained one with all of the paper sheets mounted on a spindle, but can still occur. For a spindle type paper supply, however, unwanted paper particles are frequently produced when individual sheets are pulled from the stack and the portion of the paper immediately adjacent the spindle hole is often distorted.

SUMMARY OF THE INVENTION

It is a primary object of the present invention, therefore, to provide a new and improved paper interleaver for a food patty molding machine, utilizing vacuum retention of individual paper sheets at the knock-out position of the molding machine, that effectively eliminates clogging or blockage of the vacuum portion of the interleaver due to the presence of food particles or juices, yet requires only a simple, linear movement of the individual paper sheets from a storage stack to a transfer position at the knock-out station of the machine.

Another object of the invention is to provide a new and improved paper interleaver for a food patty molding machine that is simple and economical in construction, that provides long operating life, and that effectively minimizes double-sheeting in operation of the interleaver.

An additional object of the invention is to provide a new and improved paper interleaver for a food patty molding machine that permits the use of a control spindle for the paper supply of the interleaver without engendering problems due to paper particles produced when individual paper sheets are pulled from the spindle, in an arrangement that also assures preservation of a flat configuration for each paper sheet.

Accordingly, the invention relates to a paper interleaver for a food patty molding machine of the kind comprising, a mold plate including at least one mold cavity, mold plate drive means for cyclically driving the mold plate to move the mold cavity between a fill position and a knock-out position, feed pump means for filling the mold cavity with food product each time the mold cavity is in its fill position to form a food patty in the mold cavity, and knock-out means for driving the food patty downwardly from the mold cavity each time the mold cavity is in its knock-out position. The paper interleaver comprises paper storage means for storing a stack of paper sheets in predetermined alignment on a support surface, the paper storage means having at least one access opening in its support surface affording access to the bottommost sheet in the stack, a shuttle aligned with the access opening of the paper storage means and having at least two ports facing upwardly from the shuttle, and shuttle moving means for moving the shuttle cyclically between a transfer position in which the shuttle is displaced from the paper storage means and is aligned with the mold cavity knock-out position, and a pickup position in which the shuttle occupies the access opening in the paper storage means and is closely aligned with the bottommost sheet in the stack; the mold plate drive means and the shuttle moving means operate synchronously so that the shuttle reaches its transfer position whenever the mold cavity is in its fill position and the shuttle reaches its pickup position whenever the mold cavity is in its knock-out position. A fixed paper holder frame is located beneath the knock-out position for the mold cavity and immediately above the transfer position of the shuttle, the paper holder frame having a central opening aligned with the mold cavity knock-out position that is large enough for a molded patty to pass through, the paper holder frame having a plurality of ports, around the periphery of its central opening, that face downwardly from the frame, and pneumatic means for applying a vacuum to the shuttle ports for a shuttle vacuum interval coinciding with at least the latter part of the time the shuttle is in its pickup position and ending prior to operation of the knock-out means, and for applying a vacuum to the paper holder frame ports for a holder frame vacuum interval starting approximately at the end of the shuttle vacuum interval and ending about the time of operation of the knock-out means.

BRIEF DESCRIPTION OF THE DRAWINGS

FIG. 3 is a plan view of a paper interleaver constructed in accordance with a preferred embodiment of the present invention;

FIG. 4 is a side elevation view of the paper interleaver taken approximately as indicated by line 4—4 in FIG. 3;

FIG. 5 is an end view of the paper interleaver taken approximately as indicated by line 5—5 in FIG. 3;

FIG. 6 is a detail section view of a part of a shuttle employed in the paper interleaver, taken approximately as indicated by lines 6—6 in FIG. 3;

FIG. 7 is another detail section view, taken approximately as indicated by line 7—7 in FIG. 3;

FIG. 8 is a detail section view of the paper storage portion of the paper interleaver, taken approximately as indicated by line 8—8 in FIG. 3;

FIGS. 8A and 8B are enlarged detail views of a portion of FIG. 8 illustrating two different operating conditions for the paper storage portion of the interleaver;

FIGS. 9A and 9B are sequential views of a sheet of paper fed by the interleaver;

FIG. 10 is a timing chart for operation of the patty molding machine and its interleaver mechanism;

DESCRIPTION OF THE PREFERRED EMBODIMENT

Figure 1:
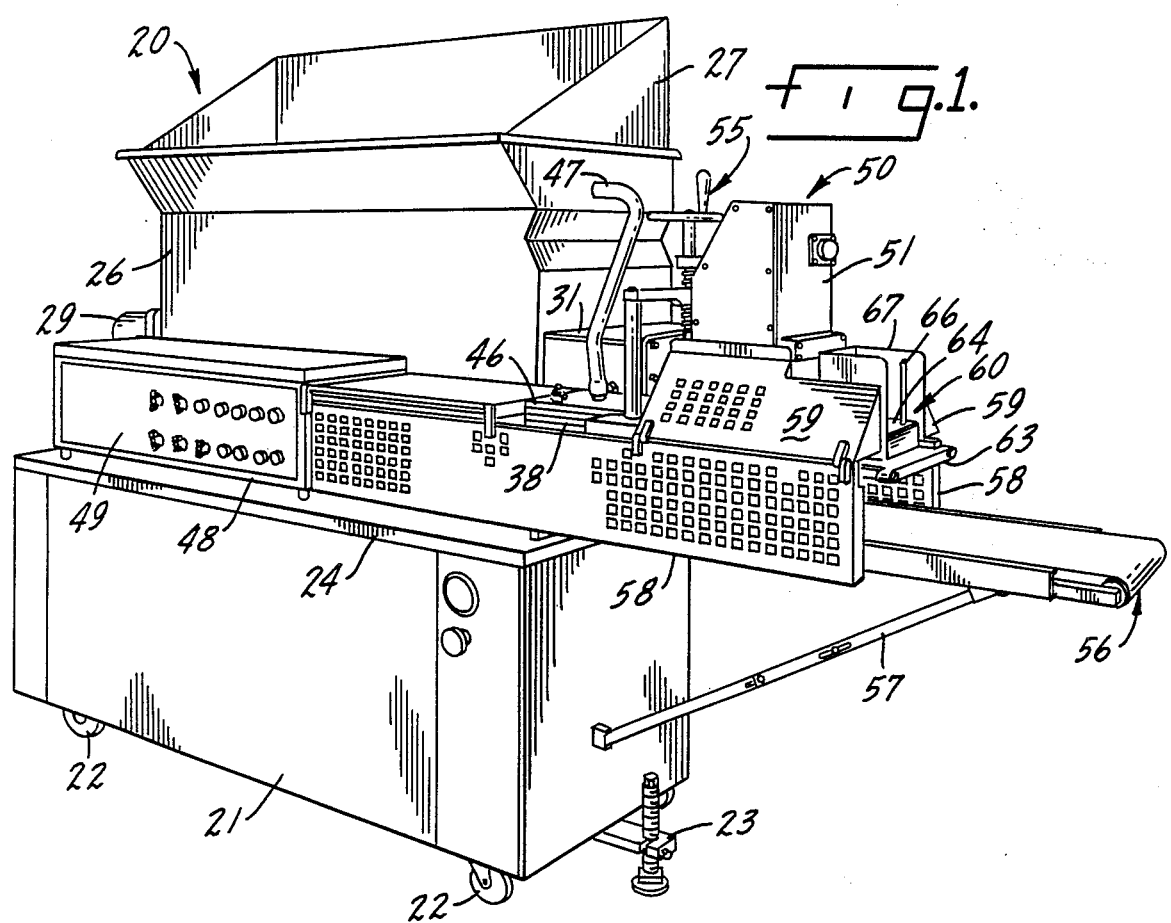
FIG. 1 is a perspective view of a food patty molding machine incorporating a paper interleaver mechanism constructed in accordance with one embodiment of the present invention.
Figure 2:
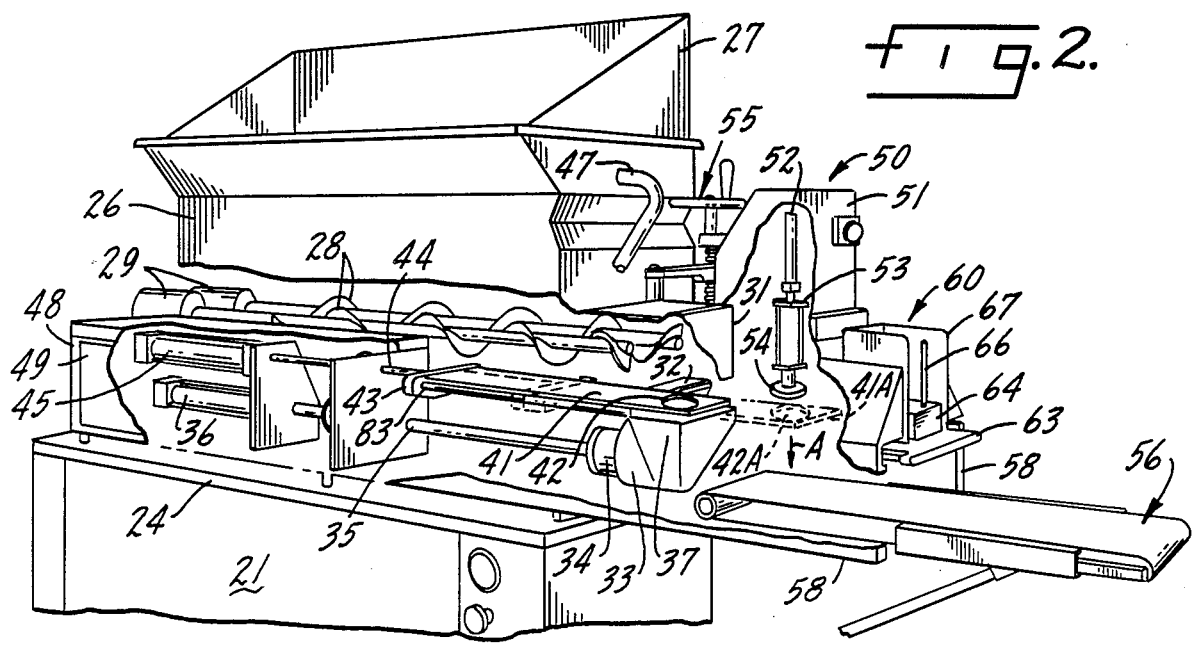
FIG. 2 is a partially schematic perspective view of the patty molding machine, like FIG. 1, with exterior housings and covers cut away to disclose principal operating components of the machine.

The food patty molding machine 20 illustrated in FIGS. 1 and 2 incorporates a patty interleaver mechanism 60 constructed in accordance with a preferred embodiment of the present invention. Patty molding machine 20 is a relatively small machine, typically producing just one molded food patty in each cycle of operation. On the other hand, machine 20 may operate at a relatively high cycle rate, sixty-five or more molding cycles or strokes per minute. It should be understood, however, that the mechanism of paper interleaver 60 is not limited to use on a small patty molding machine such as machine 20. On the contrary, the paper interleaver can be expanded in size, utilizing the same elements and functioning in accordance with the same operating cycle to produce the same results, in a substantially larger patty molding machine, including any of the Formax machines referred to above.

Food patty molding machine 20 has a base 21 mounted upon casters 22. Base 21 is also provided with a floor-engaging positioning mechanism 23 so that one end of the machine can be elevated and maintained in a fixed position in a production facility, affording a firm, three-point stance. Much of the operating mechanism of food patty molding machine 20 is located above the top 24 of its base 21. A food product hopper 26 extends along one side of the top of base 21. Hopper 26 may have a capacity of the order of 6.5 cubic feet. On a larger, multi-cavity patty molding machine, of course, the hopper 26 is likely to be substantially larger. A deflector or shield 27 is mounted at the open top of hopper 26 to guide meat, fish, or other food product into the hopper.

As shown in FIG. 2, two feed screws 28 extend longitudinally of the bottom of hopper 26. Feed screws 28 are driven by two hydraulic motors 29. The feed screws impel ground meat or other food product horizontally along the bottom of the hopper and into a short, low hopper extension enclosure 31 that encompasses the ends of feed screws 28 remote from their drive motors 29.

Hopper extension 31 is positioned immediately above a feed passage 32 that leads downwardly and laterally into the cylinder of a piston-type food product feed pump 33. The piston or plunger 34 of feed pump 33 is connected to a drive rod 35 that extends to and is operationally connected to a hydraulic drive cylinder 36. The outlet for pump 33 is a fill passage 37 that extends upwardly and laterally from the pump cylinder, into alignment with the bottom of a reciprocating mold plate 41. Mold plate 41, as illustrated in FIG. 2, incorporates only a single mold cavity 42; several could be used. In a larger machine the mold plate may well include a substantial number of mold cavities. Mold plate 41 is affixed to an inner yoke 43 that connects the mold plate to a drive rod 44. The mold plate drive rod 44, in turn, is connected to and driven by a hydraulic mold plate drive cylinder 45.

As shown in FIG. 1, machine 20 includes a cover plate 46 that is mounted over mold plate 41, the mold plate being positioned between fixed spacers 38. A conduit 47 is connected to cover plate 46 to afford a return or relief path for food air and minute quantities of product from the mold station back into hopper 26. A housing 48 encompasses the pump and mold plate drive cylinders 36 and 45; the front panel 49 of housing 48 is conveniently utilized as the control panel for machine 20.

Patty molding machine 20 further comprises a knock-out mechanism 50. The knock-out mechanism 50 includes a pneumatic cylinder 52 (FIG. 2) supported within a housing 51. A yoke 53 connects the drive rod of cylinder 52 to a knock-out cup 54 having the same configuration as mold cavity 42 but slightly smaller. A knock-out and mold lift assembly 55 is positioned between knock-out housing 51 and hopper 26, and provides for rapid and convenient change of mold plate 41 and related components in molding machine 20.

Machine 20 further comprises a discharge or takeway conveyor 56 that has one end positioned below knock-out cup 54. The other end of conveyor 56 projects outwardly to provide for removal of food patties produced by machine 20. Conveyor 56 is supported by a strut 57. A part of conveyor 56 and other portions of the operating mechanism for machine 20 are covered and protected by a pair of elongated guard plates 58 mounted on opposite sides of the machine. Two smaller, pivotally mounted guard plates 59 preclude inadvertent access to knock-out mechanism 50, mold plate 41, and the operating components of paper interleaver 60.

As thus far described, patty molding machine 20, apart from the unusual arrangement of hopper 26, pump 33, and the path from hopper 26 to mold aperture 42, is generally conventional. As to the pump 33 and related components, see the co-pending application of Glenn A. Sandberg, filed concurrently herewith. Thus, when machine 20 is placed in operation, a substantial quantity of ground meat, fish, or other food product is loaded into the open top of hopper 26, with deflector 27 helping to assure against the loss of the food product. The food product is conveyed across the bottom of hopper 26 by feed screws 28 and fills the short, low hopper extension 31. Continuing operation of feed screws 28 impels a supply of food product downwardly into feed passage 32, toward the pump chamber of feed pump 33. In subsequent operations, rapid cyclic withdrawal of plunger 34 from the cylinder of pump 33 draws food product, by vacuum, into the pump chamber.

In each cycle of operation of machine 20, there is an interval when mold plate 41 occupies the retracted "fill" position shown in phantom lines in FIG. 2, a position in which mold cavity 42 is located immediately above the fill passage 37 that is the outlet for pump 33. In each cycle there is a dwell interval for mold plate 41 with cavity 42 at the fill position. In this fill position, mold cavity 42 is filled with meat or other food product pumped upwardly through passage 37.

When mold cavity 42 is filled, as a continuing part of the operating cycle, cylinder 45 is actuated to drive the mold plate outwardly from the position shown in solid lines in FIG. 2 to the position indicated by phantom line 41A, with its filled mold cavity in a position 42A aligned accurately below knock-out cup 54 of mechanism 50. There is a dwell interval for the mold plate at the knock-out position, as indicated in FIG. 10; that dwell interval is varied to adjust the cycling rate for machine 20. With the filled cavity in this knock-out position 42A, pneumatic cylinder 52 is actuated to drive yoke 53 and cup 54 downwardly. This pushes the food patty from the cavity; the patty falls onto conveyor 56. After the knock-out operation, cylinder 52 lifts cup 54 above mold plate 41 and a machine cycle dwell occurs. In each machine cycle cylinder 45 then pulls mold plate 41 back from the knock-out position 41A to the fill position, with cavity 42 over passage 37, to begin the next cycle of operation. In each cycle, cylinder 36 actuates food pump piston 34 to force additional meat product up through fill passage 37 and into mold cavity 42 when the mold cavity is at the fill position.

During each operational cycle of food patty molding machine 20, paper interleaver 60 operates to interpose a single sheet of paper in the downward path of movement (arrow A, FIG. 2) followed by each molded food patty discharged from cavity 42 in mold plate 41. Thus, interleaver 60 must function in exact synchronism with the cyclic operation of mold plate 41. Each paper sheet should be fed separately to the position in which it is contacted by the downwardly moving meat patty, without double-sheeting and without failure to feed a sheet of paper. It is also important to minimize and control generation of bits of paper from the paper sheets, however small, which would contaminate the food patties. Moreover, it is important that the operating components of interleaver 60 be effectively immune to clogging, contamination, or other interference due to the presence of meat or other food product particles and food product juices, which are inevitably associated with the molded patties at the knock-out station.

The paper interleaver mechanism 60 of the present invention is shown in substantial detail in FIGS. 3-8. As shown in FIGS. 3 and 4, there are two fixed support rails 62 that extend parallel to each other along the opposite sides of interleaver 60. A fixed paper supply support member 63 extends between and is mounted upon the outer ends of rails 62, secured by nuts 61. The paper support member 63 is also seen in FIGS. 1, 2, 5 and 8.

The center portion 73 of paper support member 63 FIGS. 3 and 5) affords a flat support surface for a stack 64 individual paper sheets to be interleaved with the food patties produced by machine 20. The paper sheets in stack 64 preferably have a low coefficient of friction to minimize possible double sheeting. Each sheet in stack 64 is provided with an aperture 65 (see FIGS. 3, 8A, 8B, 9A, 9B) so that the entire stack 64 slides down onto a paper alignment tear pin or spindle 66 that is mounted in the center of surface 73 of support member 63 and projects upwardly therefrom as shown in FIGS. 3, 5 and 8. The alignment of the paper sheets in stack 64 is also governed by a sheet metal guide member or shield 67 that has the same basic configuration as the sheets in stack 64 (FIG. 3); guide 67 is mounted on support member 63 as best shown in FIGS. 3-5. Paper guide 67 may be secured to support member 63 by any appropriate means, such as a plurality of screws 68. The front 67A of guide 67 is open to allow removal of sheets of paper from stack 64; see FIGS. 4 and 5.

The upper surface 73 of support member 63, on which paper stack 64 is supported, is not a continuous flat surface. Thus, support member 63 affords two elongated guide slots 69. Slots 69 are parallel to guide rod 62 and provide access to the bottom sheet of stack 64 as described more fully hereinafter. Each guide slot 69 is immediately adjacent to a more shallow slot 71 that is a part of the mounting arrangement for the sheet metal paper guide 67 (FIG. 5).

As best shown in FIGS. 3, 5 and 8, the center portion of support member 63, where pin 66 is mounted, is formed with a shallow paper realignment groove 72. The outer end 72A of groove 72 is of constant depth, as shown in FIG. 7. The inner end 72B of groove 72 tapers gradually up to the upper or support surface 73 of member 63. The walls 72C of groove 72 are tapered throughout their lengths. Pin 66 is located centrally of the constant depth portion 72A of groove 72. There are two discharge apertures 74 extending downwardly through support member 63 in this same portion 72A of groove 72. Apertures 74 end in a discharge slot 75 located above a sheet metal paper particle discharge tray 76.

Paper interleaver 60 further comprises a shuttle including a yoke 82 that is secured to two elongated rods 83 by a pair of bolts 84, rods 83 being affixed to the mold plate yoke 43; see FIGS. 2-5. Two fixed guide members 85 mounted on rods 62 extend around and guide sliding movement of the rods 83.

Interleaver mechanism 60 further comprises two spaced shuttle fingers 86 which are mounted on and project from shuttle yoke 82, toward member 63, in a direction parallel to support rods 62 (FIG. 3). Each shuttle finger 86 is provided with an internal passage 87 extending longitudinally of the shuttle finger between two ports 88 and 89. Ports 88 and 89 open upwardly from shuttle fingers 86; FIGS. 3, 6 and 7. In FIG. 3 ports 88 are shown with three linear slots and ports 89 with a plural V-slot configuration. Both port shapes afford consistent and effective operation and both are preferable to simple circular openings. Each shuttle finger 86 is provided with a vacuum/pressure connection passage 91 for connection to a pneumatic system; see FIG. 11. Flexible connections are used, due to a requirement for movement of shuttle 82–86. As can be seen best in FIG. 5, each of the shuttle fingers 86 is aligned with one of the guide slots 69 in paper support member 63.

A stationary paper sheet holder frame 92 is fixedly mounted in machine 20 on the inner or rearward side of support member 63; see FIGS. 3, 4 and 7. The central portion 93 of frame 92 extends over shuttle fingers 86, as shown in FIG. 3; it has a large opening 102. There is a pneumatic passage 94 along each side of sheet holder frame 92, connecting to four small pneumatic ports 95 facing downwardly from the lower surface of frame 92. That is, ports 95 open down, away from the plane of FIG. 3, at the corners of opening 102. The pneumatic passage system in sheet holder frame 92 also includes a transverse passage 96 across the central portion 93, linking the two passages 94, and an external pneumatic connection port 97.

In each cycle of operation of patty molding machine 20, as previously described, mold plate 41 moves from the fill position with its mold cavity 42 aligned with the fill passage 37 outwardly to the knock-out position 41A, 42A shown in phantom lines in FIG. 2. In FIG. 3, mold plate 41 is also shown at its fill position. When mold plate 41 advances to the knock-out position, its mold plate cavity is in the position indicated by phantom outline 42A; shuttle yoke 82 is advanced concurrently to the position shown by phantom outline 81A in FIG. 3. The knock-out positions for elements 83 and 84 are also indicated, at 83A and 84A, in FIG. 3. Furthermore, this movement of yoke 82, which occurs in each machine cycle, brings shuttle fingers 86 to the positions 86A of FIG. 3, in which the shuttle fingers are fully inserted into slots 69 in support member 63. As a consequence, vacuum ports 88 and 89 are in the positions 88A and 89A immediately below the paper stack 64 of interleaver 60. With this simple, basic reciprocal movement for shuttle yoke 82 and shuttle fingers 86 accounted for, driven along a linear path directly by movement of mold plate 41, operation of paper interleaver 60 can now be considered.

For initial consideration of operation of the interleaver, it may be assumed that shuttle 82 and its shuttle fingers 86 are in the position shown in solid lines in FIG. 3, because mold plate 41 is in its fill position; this is the transfer position for shuttle 81–86. When the mold cavity 42 (FIG. 2) has been filled, mold plate 41 is driven to the right, as seen in FIG. 3, until the mold plate cavity is in its knock-out position 42A. As previously noted, at this point shuttle fingers 86A are positioned under paper stack 64, within slots 69 in support member 63; shuttle 82–86 is now in its pickup position.

Figure 11:
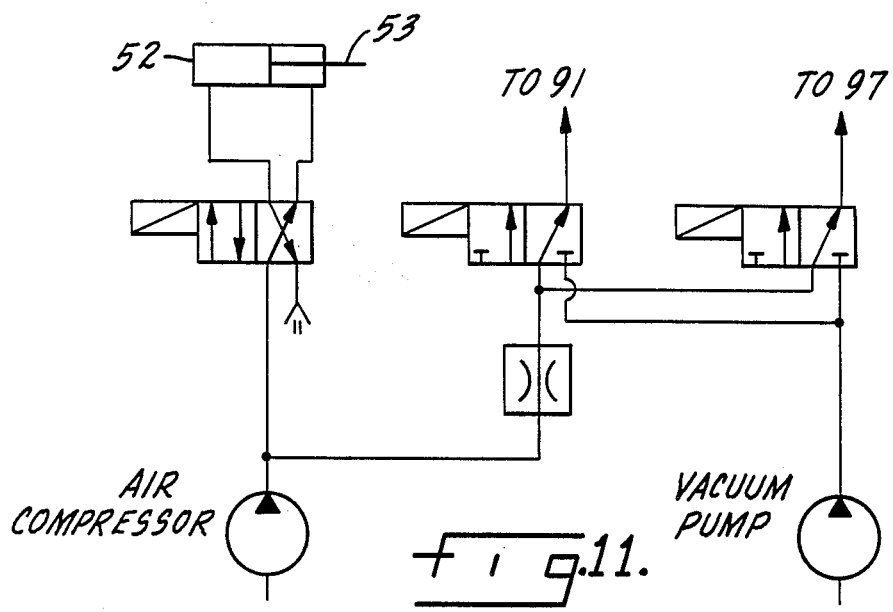
FIG. 11 is a simplified pneumatic schematic for the patty molding machine, with relief valves and other accessories omitted.

When the shuttle 82–86 of interleaver 60 is in its pickup position, the passages 87 in shuttle fingers 86 are operationally connected to a vacuum source; see FIGS. 10 and 11. The vacuum, acting through ports 88 and 89, pulls the bottom sheet 64A (FIG. 5) from stack 64 firmly onto the two shuttle fingers. When the bottom sheet is thus captured, and mold plate 41 subsequently begins its return movement toward its fill position, the bottom sheet from stack 64 is pulled along with shuttle fingers 86 from their pickup position 86A toward the transfer position of FIG. 3, where shuttle fingers 86 are shown in solid lines.

When shuttle 82–86 starts the movement from its pickup position to its transfer position, the portion of the bottom paper sheet 64A immediately to the right of its opening 65 around spindle 66 is split or torn. As the sheet is pulled away, the torn edges of the paper sheet are deflected downwardly into portion 72A of groove 72 in support member 63 (FIGS. 3, 8). As a result, when sheet 64A is pulled away from guide pin 66, it has the appearance shown in FIG. 9A, with very small depending tabs 98 at the tear in the paper. Downward deflection of tabs 98 is caused by a groove 101 in the pin or spindle 66; see FIGS. 5 and 8.

Tabs 98 do not remain in the depending position as shown in FIG. 9A. As movement of sheet 64A continues away from pin 66, the progressively shallower portions 72B of groove 72, with their inclined sides 72C, push the depending tabs 98 back toward the plane of the sheet of paper. In effect, the torn portions of the paper sheet, initially deflected downwardly by the paper tearing groove 101 in the guide spindle 66, are folded back to the flat condition shown in FIG. 9B due to the contour of groove 72.

While it might be thought that a sharp corner or edge on the portion of pin 66 that is engaged by the bottommost sheets in stack 64 would afford the most effective cutting or tearing action for that sheet, this is not necessarily true. A more efficient configuration for the part of pin 66 that is engaged by the bottommost sheet is that shown by groove 101 in FIGS. 5, 8, 8A and 8B. As seen in FIG. 8A, groove 101 in pin 66 has its top edge 103 aligned with the lowermost sheet 64A in the paper stack. Groove 101 is of rounded configuration, a configuration that seems to afford better performance than a sharply cornered arrangement. Furthermore, the rounded paper-tearing groove 101 is easier to form and requires no special rotary alignment of pin 66 in its mounting in support member 63.

The alignment of the bottommost sheet 64A in the stack with the top edge 103 of groove 101 is the preferred alignment for paper having relatively low tear resistance. However, it is not the most efficient alignment for paper that has a high tear resistance. In the latter instance, the arrangement shown in FIG. 8B is preferred, with the bottommost sheet 64A in the stack aligned slightly above the narrowest portion of groove 101.

Each sheet 64A that is pulled from the bottom of stack 64 by interleaver 60 is literally torn at the back end of the sheet when the sheet is pulled off of groove 101 in guide spindle 66. Inevitably, therefore, some paper particles are produced in this part of interleaver 60. Any such particles drop into groove 72 and are discharged through apertures 74 and downwardly into tray 76 below slot 75. In addition to serving as a part of the discharge arrangement for any paper particles, slot 75 also allows convenient access to the lower end of pin 66 for adjustment of its height in accordance with the conditions discussed above in relation to FIGS. 8A and 8B.

When mold plate 41 again reaches its fill position, shuttle 82–86 is in the transfer position shown in solid lines in FIG. 3. The paper sheet is then held on shuttle 82–86 in the position indicated by phantom outline 64B, being retained there by the vacuum applied through ports 88 and 89 of fingers 86. At this juncture, during the interval when the mold cavity of plate 41 is being filled with food product, the vacuum connection to ports 88 and 89 is interrupted and air under pressure is supplied through passages 91 and 87 to the same ports 88 and 89, pushing the paper sheet at position 64B upwardly away from shuttle fingers 86 and toward paper holder frame 92.

The resultant upward movement of sheet 64B, which is very small, brings the paper sheet 64B into contact with the underside of sheet holder frame 92, in alignment with the pneumatic ports 95 at the corners of frame opening 102. At this time, ports 95 are operationally connected, through passages 94, 96, and 97, to an appropriate vacuum source. As a consequence, sheet 64B is now held against the lower surface of sheet holder frame 92, just barely out of contact with shuttle fingers 86. The spacing between the upper surfaces of shuttle fingers 86 and the lower surface of sheet holder frame 92 is quite small, only about 0.032 to 0.062 inch. That spacing is preferably just a little bit greater than the thickness of one the paper sheets. The close spacing provides no problem, however, since the vacuum applied through ports 95 to hold the sheet against the bottom surface of frame 92 can easily hold the lightweight paper sheet clear of fingers 86.

Subsequently, in the regular cyclic operation of patty molding machine 20, mold plate 41 moves back to its knock-out position, which moves the interleaver shuttle fingers 86 back into pickup positions 86A in slots 69 below the paper stack 64 on support 63. It is at this time in the machine cycle (FIG. 10) that knock-out mechanism 50 (FIG. 2) is actuated, driving a molded food patty downwardly through the opening 102 in frame 92 (FIG. 3). The food patty, having the same outline 42A as the mold cavity in which it is molded, drives the paper sheet 64B downwardly away from sheet holder frame 92. Ports 95 may be under pressure during a substantial portion of the machine cycle; see FIGS. 10 and 11 This helps to avoid clogging of the ports.

In the operation of interleaver 60, each paper sheet 64 is pulled tightly onto shuttle fingers 86, while in their transfer positions 86A, due to the vacuum provided at ports 88 and 89. As a consequence, there is little friction developed in the initial sheet pickup and little tendency toward "double-sheeting" in the operation of the paper interleaver. Use of low friction paper, which presents no problems in device 60, also aids in preventing double-sheeting. Single sheets are fed effectively and cleanly from the bottom of stack 64.

Groove 101 in paper guide pin 66, when properly adjusted as to height, as discussed in connection with FIGS. 8A and 8B, affords an efficient action in releasing each individual paper sheet, while pin 66 and guide 67 effectively align the paper supply 64 in the interleaver. Groove 101 in pin 66 does tend to turn the edges of the torn paper downwardly as indicated by the minute flaps 98 in FIG. 9A. However, this distortion of a limited portion of the paper is corrected by groove 72, and particulary by the action of inclined walls 72C in tapered groove 72B in folding the edges of the torn part of the paper back into alignment in the same plane as the rest of the paper, as shown in FIG. 9B.

In each cycle of operation of sheet interleaver 60, each paper sheet, as previously noted, is held tightly on shuttle 82–86 by vacuum action applied through ports 88 and 89. But the vacuum shuttle used to perform this pickup operation is not utilized to hold the sheets for contact with patties at the knock-out station of the patty molding machine. Instead, at the knock-out position each sheet is pneumatically "puffed" upwardly away from the shuttle fingers 86 that brought it there and is picked up and retained by vacuum at the ports 95 on the stationary frame 92. The value of this arrangement is best understood when it is noted that the vacuum ports 95 of frame 92 face downwardly, away from mold plate 41 and its mold cavity from which a patty is driven onto each paper sheet. As a consequence, the downwardly driven patty (outline 42B, FIG. 3) cannot deposit food particles, juices, or other detritus in ports 95. The shuttle ports 88 and 89, on the other hand, are always out of the way, in positions 88A and 89A under stack 64, during the knock-out interval when a molded food patty is falling onto the paper in the interleaver. Thus, the shuttle ports also cannot be fouled by food patty materials or juices.

Figure 12:
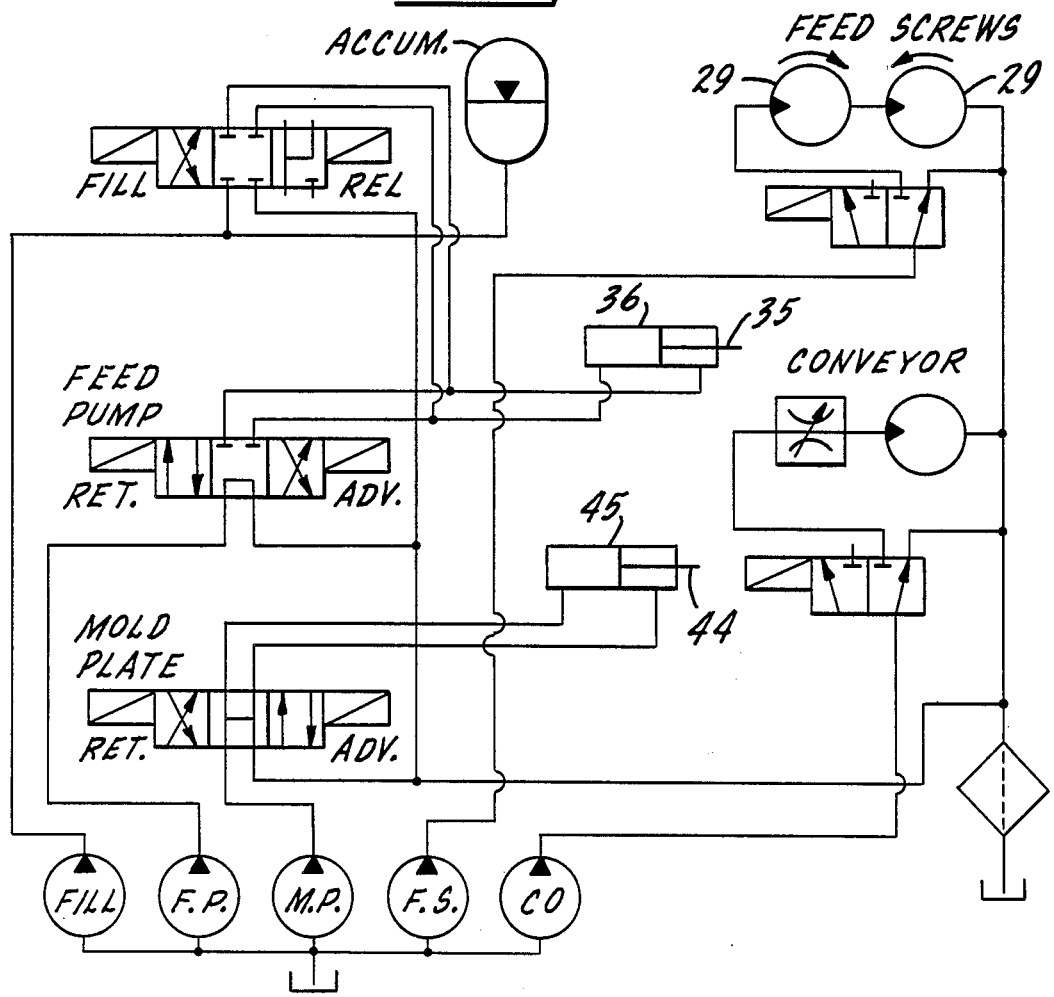
FIG. 12 is a simplified hydraulic schematic for the patty molding machine, with relief valves and other accessories omitted.

A typical timing arrangement for the operation of feed screws 28, pump plunger 34, mold plate 41, knock-out cup 54, shuttle 81–86, and frame 92 including completion and interruption of vacuum and pneumatic connections, is provided in FIG. 10. Pneumatic and hydraulic schematics for machine 20, with auxiliaries such as relief valves, drain valves, and gauges omitted, are shown in FIGS. 11 and 12. These figures are essentially self-explanatory. It should be kept in mind that both schematics are subject to variation and that timing of machine operations can be varied. FIGS. 10–12 are thus exemplary, and not representative of limitations on the invention, though the timing relationships between different functions shown in FIG. 10 can be important to optimum operation. To vary the length of the machine cycle, the post knock-out dwell (FIG. 1) is varied. This adjustment, which can be effected without disturbing any functional interrelationships in machine 20, allows for a broad rate adjustment (e.g., twenty to sixty-five machine cycles or strokes per minute). A wide variety of conventional electronic and electrical controls can be used for machine 20; hence, no electrical control is shown.

We claim:

1. A paper interleaver for a food patty molding machine of the kind comprising:

a mold plate including at least one mold cavity;

mold plate drive means for cyclically driving the mold plate to move the mold cavity between a fill position and a knock-out position;

feed pump means for filling the mold cavity with food product each time the mold cavity is in its fill position to form a food patty in the mold cavity;

and knock-out means for driving the food patty downwardly from the mold cavity each time the mold cavity is in its knock-out position;

the paper interleaver comprising:

paper storage means for storing a stack of paper sheets in predetermined alignment on a support surface, the paper storage means having at least one access opening in its support surface affording access to the bottommost sheet in the stack;

a shuttle aligned with the access opening of the paper storage means and having at least two ports facing upwardly from the shuttle;

shuttle moving means for moving the shuttle cyclically between a transfer position in which the shuttle is displaced from the paper storage means and is aligned with the mold cavity knock-out position, and a pickup position in which the shuttle occupies the access opening in the paper storage means and is closely aligned with the bottommost sheet in the stack;

the mold plate drive means and the shuttle moving means operating synchronously so that the shuttle reaches its transfer position whenever the mold cavity is in its fill position and the shuttle reaches its pickup position whenever the mold cavity is in its knock-out position;

a fixed paper holder frame located beneath the knock-out position for the mold cavity and immediately above the transfer position of the shuttle, the paper holder frame having a central opening aligned with the mold cavity knock-out position that is large enough for a molded patty to pass through;

the paper holder frame having a plurality of ports, around the periphery of its central opening, that face downwardly from the frame;

and pneumatic means for applying a vacuum to the shuttle ports for a shuttle vacuum interval coinciding with at least the latter part of the time the shuttle is in its pickup position and ending prior to operation of the knock-out means, and for applying a vacuum to the paper holder frame ports for a holder frame interval starting approximately at the end of the shuttle vacuum interval and ending about the time of operation of the knock-out means.

2. A paper interleaver for a food patty molding machine, according to claim 1, in which the mold plate and the shuttle each move reciprocally along a simple, linear path, and the two paths are parallel.

3. A paper interleaver for a food patty molding machine, according to claim 1, in which:

the pneumatic means includes means for applying air under positive pressure through the shuttle ports in approximate coincidence with beginning of the holder frame vacuum interval.

4. A paper interleaver for a food patty molding machine, according to claim 3, in which the pneumatic means includes means for applying air under positive pressure to the paper holder frame ports following operation of the knock-out means.

5. A paper interleaver for a food patty molding machine, according to claim 4, in which:

the pneumatic means applies air under positive pressure to the paper holder frame ports when a vacuum is applied to the shuttle ports; and the pneumatic means applies air under positive pressure to the shuttle ports when a vacuum is applied to the paper holder frame ports.

6. A paper interleaver for a food patty molding machine, according to claim 3, in which:

operation of the knock-out means, the end of the holder frame vacuum interval, and initiation of the shuttle vacuum interval all overlap each other.

7. A paper interleaver for a food patty molding machine, according to claim 2, in which:

the shuttle moving means is a direct mechanical connection between the mold plate and the shuttle, compelling the shuttle to move synchronously with the mold plate.

8. A paper interleaver for a food patty molding machine, according to claim 1, in which:

the mold plate moves reciprocally along a linear path;

the paper storage means has two access openings formed as slots in its support surface, the slots extending parallel to the mold plate path; and the shuttle comprises two fingers, parallel to the mold plate path, each aligned with a paper storage means slot;

the shuttle moves reciprocally along a linear path parallel to the mold plate path;

the shuttle fingers each include at least two ports;

and each shuttle finger is disposed within a paper storage means slot when the shuttle is in its pickup position.

9. A paper interleaver for a food patty molding machine, according to claim 8, in which:

the shuttle moving means is a direct mechanical connection between the mold plate and the shuttle, compelling the shuttle to move synchronously with the mold plate.

10. A paper interleaver for a food patty molding machine, according to claim 8, in which:

the pneumatic means includes means for applying air under positive pressure through the shuttle ports in approximate coincidence with beginning of the holder frame vacuum interval.

11. A paper interleaver for a food patty molding machine, according to claim 10, in which the pneumatic means includes means for applying air under positive pressure to the paper holder frame ports following operation of the knock-out means 12. A paper interleaver for a food patty molding machine, according to claim 11, in which:

the pneumatic means applies air under positive pressure to the paper holder frame ports when a vacuum is applied to the shuttle ports; and the pneumatic means applies air under positive pressure to the shuttle ports when a vacuum is applied to the paper holder frame ports.

13. A paper interleaver for a food patty molding machine, according to claim 10, in which:

operation of the knock-out means, the end of the holder frame vacuum interval, and initiation of the shuttle vacuum interval all overlap each other.

14. A paper interleaver for a food patty molding machine, according to claim 1, in which:

each paper sheet in the stack includes an alignment aperture;

and in which the interleaver further comprises:

an elongated paper realignment groove in the paper stack support surface, extending parallel to the direction of movement of the shuttle from its pickup position to its transfer position;

a paper alignment spindle projecting upwardly from the portion of the groove farthest from the paper holder frame, through the alignment apertures in all sheets in the stack;

and an annular paper-tearing groove in the spindle, closely adjacent the stack support surface;

the paper realignment groove tapering gradually upwardly from a point near the spindle to the stack surface.

15. A paper interleaver for a food patty molding machine, according to claim 14, in which the walls of the paper realignment groove are tapered upwardly and outwardly throughout substantially its entire length.

16. A paper interleaver for a food patty molding machine, according to claim 15, in which the paper storage means includes at least one discharge aperture extending downwardly from the realignment groove to discharge particles of paper produced by tearing paper sheets from the spindle.

17. A paper interleaver for a food patty molding machine, according to claim 15, including means to adjust the height of the spindle to vary location of the paper tearing groove relative to the stack support surface.

18. A paper interleaver for a food patty molding machine, according to claim 15, in which:
the mold plate moves reciprocally along a linear path;
the paper storage means has two access openings formed as slots in its support surface, the slots extending parallel to the mold plate path; and
the shuttle comprises two fingers, parallel to the mold plate path, each aligned with a paper storage means slot;
the shuttle moves reciprocally along a linear path parallel to the mold plate path;
the shuttle fingers each include at least two ports;
and each shuttle finger is disposed within a paper storage means slot when the shuttle is in its pickup position.

19. A paper interleaver for a food patty molding machine, according to claim 15, in which:
the pneumatic means includes means for applying air under positive pressure through the shuttle ports in approximate coincidence with beginning of the holder frame vacuum interval.

20. A paper interleaver for a food patty molding machine, according to claim 19, in which the pneumatic means includes means for applying air under positive pressure to the paper holder frame ports following operation of the knock-out means 21. A paper interleaver for a food patty molding machine, according to claim 20, in which:
the pneumatic means applies air under positive pressure to the paper holder frame ports when a vacuum is applied to the shuttle ports; and
the pneumatic means applies air under positive pressure to the shuttle ports when a vacuum is applied to the paper holder frame ports.

22. A paper interleaver for a food patty molding machine, according to claim 19, in which:
operation of the knock-out means, the end of the holder frame vacuum interval, and initiation of the shuttle vacuum interval all overlap each other.

23. A paper interleaver for a food patty molding machine, according to claim 15, in which:
the shuttle moving means is a direct mechanical connection between the mold plate and the shuttle, compelling the shuttle to move synchronously with the mold plate.

24. A paper interleaver for a food patty molding machine, according to claim 15, in which the mold plate and the shuttle each move reciprocally along a simple, linear path,
and the two paths are parallel.

* * * * *